United States Patent
Horev et al.

(10) Patent No.: US 12,244,416 B2
(45) Date of Patent: Mar. 4, 2025

(54) SYSTEMS AND METHODS OF INITIATING RETRANSMISSION REQUESTS

(71) Applicant: MELLANOX TECHNOLOGIES, LTD., Yokneam (IL)

(72) Inventors: Asaf Horev, Ramat Gan (IL); Ran Ravid, Tel Aviv (IL); Guy Lederman, Ness Zionna (IL); Roman Meltser, Atlit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/192,239

(22) Filed: Mar. 29, 2023

(65) Prior Publication Data
US 2024/0333423 A1 Oct. 3, 2024

(51) Int. Cl.
*H03M 13/00* (2006.01)
*H04L 1/00* (2006.01)

(52) U.S. Cl.
CPC .......... *H04L 1/0057* (2013.01); *H04L 1/0041* (2013.01)

(58) Field of Classification Search
CPC ................ H04L 1/0057; H04L 1/0041
See application file for complete search history.

(56) References Cited

U.S. PATENT DOCUMENTS

| | | | |
|---|---|---|---|
| 9,344,117 B2 | 5/2016 | Mula et al. | |
| 9,876,727 B2 | 1/2018 | Gaist et al. | |
| 2003/0097623 A1* | 5/2003 | Razavilar | H04L 1/20 714/704 |
| 2009/0100310 A1* | 4/2009 | Yoo | H04L 1/1819 714/748 |
| 2015/0278008 A1* | 10/2015 | Ren | H04L 1/0045 714/776 |
| 2023/0223961 A1* | 7/2023 | McCrate | H03M 13/154 714/746 |
| 2023/0396268 A1* | 12/2023 | Lim | H03M 13/373 |

OTHER PUBLICATIONS

Pless "Introduction to the Theory of Error-Correcting Codes," Wiley-Interscience, Jul. 1998, 3rd edition, 216 pages.
"Hybrid automatic repeat request," Wikipedia, last updated Jun. 8, 2015, 4 pages [retrieved online Sep. 24, 2024 from: en.wikipedia.org/w/index.php?title=Hybrid_automatic_repeat_request&oldid=666015657].
Kotuliakova et al. "Analysis of HARQ schemes using Reed-Solomon codes," IEEE, 2008 15th International Conference on Systems, Signals and Image Processing, Jun. 2008, 4 pages.

(Continued)

*Primary Examiner* — Christine T. Tu
(74) *Attorney, Agent, or Firm* — Sheridan Ross P.C.

(57) ABSTRACT

A communication system is described, among other things. An illustrative system is disclosed to include one or more decoding circuits to perform forward error correction for a received data block in a physical layer and one or more cyclic redundancy check circuits to perform a cyclic redundancy check based on a first output of the decoding circuits and a cyclic redundancy check code generated in the physical layer based on the received data block. In response to one or more of a second output of the decoding circuits and an output of the cyclic redundancy check circuits, a retransmission request of the data block is initiated.

20 Claims, 3 Drawing Sheets

(56) References Cited

OTHER PUBLICATIONS

Liang et al. "Piggyback Retransmissions over Wireless MIMO Channels: Shared Hybrid-ARQ (SHARQ) for Bandwidth Efficiency," IEEE Transactions on Wireless Communications, Aug. 2013, vol. 12, No. 8, pp. 3770-3782.
Wicker et al. "Reed-Solomon Codes in Hybrid Automatic Repeat-Request Protocols," IEEE Press, Ed. By Wicker et al., Reed-Solomon codes and their applications, Chapter 7, pp. 125-147.
Wicker "High-Reliability Data Transfer Over the Land Mobile Radio Channel Using Interleaved Hybrid-ARQ Error Control," IEEE Transactions on Vehicular Technology, Feb. 1990, vol. 39, No. 1, pp. 48-55.
Wicker "Type-II Hybrid-ARQ Protocols Using Punctured Reed-Solomon Codes," IEEE, Military Communications Conference (MILCOM 91), Nov. 1991, pp. 1229-1234.
Wicker "Reed-Solomon Error Control Coding for Rayleigh Fading Channels with Feedback," IEEE Transactions on Vehicular Technology, May 1992, vol. 41, No. 2, pp. 124-133.

\* cited by examiner

SYSTEMS AND METHODS OF INITIATING RETRANSMISSION REQUESTS

FIELD OF THE DISCLOSURE

The present disclosure is generally directed to systems, methods, and devices for error checking and, in particular, performing a retransmission request based on analysis in a physical layer.

BACKGROUND

High-speed networking systems are dominated by noisy and error prone channels. Forward error correction (FEC) codes such as Reed-Solomon codes (RS codes) are used to overcome burst error channels, yet they are not sufficient to guarantee a low mean time to false packet acceptance rate (MTTFPA).

In high-speed networking systems, burst errors occur when multiple contiguous bits are in error within a single data unit, such as a packet or frame. Burst errors can be especially damaging to data transmission because they can potentially cause an entire packet or frame to be discarded.

Burst errors can have a significant impact on the performance of high-speed networking systems because they can cause increased numbers of retransmissions and decrease overall system throughput. This can lead to congestion on the network, leading to longer delays and decreased reliability.

SUMMARY

As described above, high-speed networking systems are dominated by noisy and error prone channels. To mitigate the effects of burst errors, high-speed networking systems may employ FEC codes, such as RS codes, that can detect and correct these errors.

While FEC codes can be used to detect and correct burst errors, such error-correction techniques are not sufficient to guarantee a low MTTFPA. In a high-speed networking system, the MTTFPA refers to the average amount of time it takes for a false or incorrect packet to be accepted by the system as a valid one.

The systems and methods described herein can reduce effective bit error rate (BER) and enable operation in noisy and burst error communication channels while maintaining a low MTTFPA.

The systems and methods described herein involve a hybrid automatic repeat query (H-ARQ). The H-ARQ as described herein is a combination of high-rate FEC and ARQ error-control. In one or more of the embodiments described herein, cyclic redundancy check (CRC) is combined with RS code correction & detection capabilities, establishing two different data block rejection points on the receive data path, effectively improving link integrity.

The disclosed systems and methods involve H-ARQ algorithm error detection points, which may include receive data path points when a data block is rejected, and retransmission is requested. Combining typical CRC error detection with RS error detection capabilities allows double layer protection and gradual reject data points.

Some high-speed Ethernet networks apply FEC at the physical layer, processing mostly 5440b blocks or its multiples for interleaving. A next level of protection, CRC, is applied only at the link layer after constructing the data packet from physical layer data blocks. In this way. CRC is applied up in the layer stack and error detection capabilities of conventional systems vary with packet size which can vary from packet to packet. A CRC performed in the physical layer as described herein is more efficient than a CRC performed in the link layer.

The systems and methods described herein improve conventional systems by providing both FEC and CRC error detection capabilities as part of the physical layer, applying both FEC and CRC on the same fundamental data block size. As a result, the systems and methods described herein eliminate the additional latency afflicting conventional systems due to packets decapsulation up in the layers stack.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
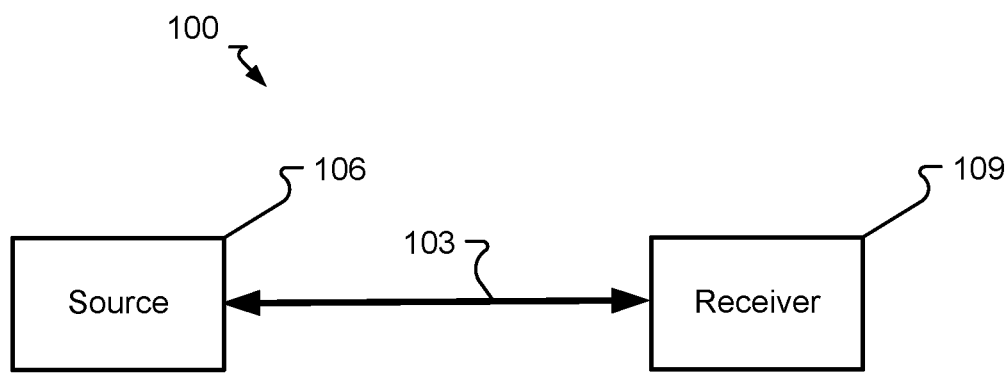
FIG. 1 is a block diagram of a network in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

The exemplary systems and methods of this disclosure have been described in relation to a network of switches; however, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X. Y. and Z, a combination of elements selected from the same class (e.g., X1 and X2) as well as a combination of elements selected from two or more classes (e.g., Y1 and Zo).

As described above, high-speed networking systems are dominated by noisy and error prone channels. FEC codes such as RS codes are used to overcome burst error channels, yet they are not sufficient to guarantee low MTTFPA.

In high-speed networking systems, burst errors occur when multiple contiguous bits are in error within a single data unit, such as a packet or frame. Burst errors can be especially damaging to data transmission because they can potentially cause an entire packet or frame to be discarded.

Burst errors can have a significant impact on the performance of high-speed networking systems because they can cause increased numbers of retransmissions and decrease overall system throughput. This can lead to congestion on the network, leading to longer delays and decreased reliability.

While FEC codes can be used to detect and correct burst errors, such error-correction techniques are not sufficient to guarantee a low mean-time to false packet acceptance rate (MTTFPA). In a high-speed networking system, the MTTFPA refers to the average amount of time it takes for a false or incorrect packet to be accepted by the system as a valid one.

A low MTTFPA is important for several reasons. False packets can result in errors, misroutes, and security breaches, which can have significant consequences for the network and the applications it supports. For example, low MTTFPA can improve data integrity. A low MTTFPA means that the system is less likely to accept false packets, which could contain incorrect or malicious data. This helps to ensure the integrity of the data being transmitted and received.

A low MTTFPA can also improve network security. False packets could contain malicious data or be used to launch attacks on the network. By reducing the likelihood of false packets being accepted, the network becomes more secure.

A low MTTFPA can improve network performance. When false packets are accepted, they can cause errors in the transmission and result in retransmissions or the need for error correction. This can decrease network performance and lead to longer delays. Accepting false packets also consumes resources, such as bandwidth, memory, and processing power. By reducing the likelihood of false packets being accepted, these resources can be used more efficiently.

For example, in a financial transaction network, a false packet could result in the incorrect transfer of funds. In a healthcare network, false packets could result in incorrect patient diagnoses or treatments. In a military network, false packets could compromise sensitive information and potentially put lives at risk. For these reasons and others, it is crucial to maintain a low MTTFPA in a high-speed networking system to ensure the reliability and security of the network.

The systems and methods described herein can reduce effective BER and enable operation in noisy and burst error communication channels while maintaining a low MTTFPA.

Conventional systems use automatic repeat request (ARQ) error-control as a retransmission protocol to determine when to request a retransmission of data. The systems and methods described herein involve a hybrid automatic repeat query (H-ARQ). The H-ARQ as described herein is a combination of high-rate FEC and ARQ error-control. In one or more of the embodiments described herein, CRC is combined with RS code correction & detection capabilities, establishing two different data block rejection points on the receive data path, effectively improving link integrity.

As described above, high-speed networking systems are dominated by very noisy and error prone channels. FEC codes such as RS codes are used to overcome burst error channels, yet they are not sufficient to guarantee low MTTFPA (mean time to false packet acceptance) rate. To enhance error correction and detection scheme, the systems and methods described herein employ an ARQ mechanism in conjunction with an FEC scheme.

The disclosed systems and methods involve H-ARQ algorithm error detection points, i.e., receive data path points when data block is rejected, and retransmission is requested. Combining typical CRC error detection with RS error detection capabilities, allows double layer protection and gradual reject data points.

Conventional modern high-speed Ethernet networks apply FEC at the physical layer, processing mostly 5440b blocks or its multiples for interleaving. A next level of protection, CRC, is applied only at the link layer after constructing the data packet from physical layer data blocks. In this way, CRC is applied up in the layer stack and error detection capabilities of conventional systems vary with packet size which can vary from packet to packet. A CRC performed in the physical layer as described herein is more efficient than a CRC performed in the link layer.

The systems and methods described herein improve conventional systems by providing both FEC and CRC error detection capabilities as part of the physical layer, applying both FEC and CRC on the same fundamental data block size. As a result, the systems and methods described herein eliminate the additional latency afflicting conventional systems due to packets decapsulation up in the layers stack.

As illustrated in FIG. 1, a communication link 103 such as a network connection may be established between a source 106 and a receiver 109. The communication link 103, as described herein, may be any type of communication link 103 capable of being used to transmit data from a source to a receiver. For example, the communication link 103 may be a wired link providing a physical connection between the source 106 and receiver 109 using cables, such as Ethernet cables, coaxial cables, or fiber optic cables. In some embodiments, the communication link 103 may be a wireless link using wireless signals, such as Wi-Fi, Bluetooth, or a cellular network.

The source 106 may be any type of computing device capable of sending a stream of data to the receiver 109 and receiving an acknowledgement message or a retransmission request from the receiver 109 as described herein.

Figure 2:
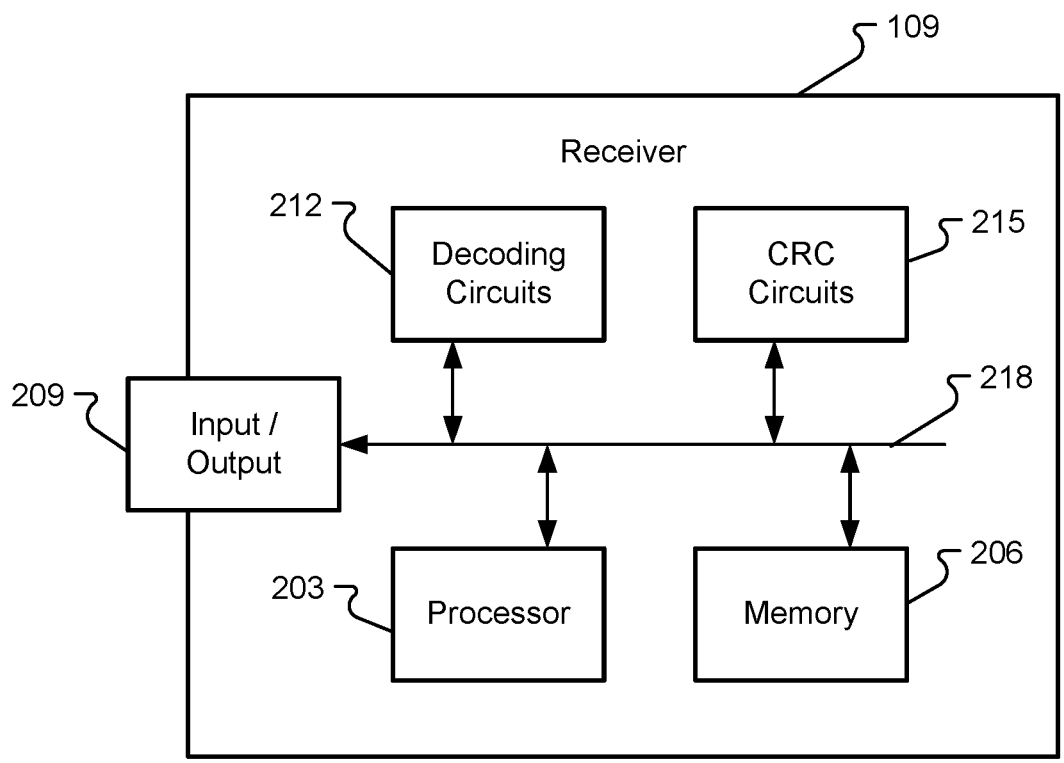
FIG. 2 is a block diagram of a receiver in accordance with one or more of the embodiments described herein.

The receiver 109 may be an Ethernet switch or other type of computing device capable of receiving and transmitting data from the source 106. For example, as illustrated in FIG. 2, the receiver 109 may receive data from the source 106 via an input/output device 209. The input/output device 209 may, for example, be a transceiver. The input/output device 209 may be capable of sending and receiving optical and/or electrical signals.

Data may be received by the receiver 109 in the form of electrical or optical signals and converted into digital data by a physical layer of the receiver 109. The physical layer of the receiver 109 may be responsible for establishing the physical connection between the receiver 109 and the source 106 and converting the electrical signals into digital signals that can be processed by the receiver 109. The physical layer may be a physical coding sub (PCS) layer as defined by the IEEE.

The receiver 209 may further comprise a processor 203, memory 206, and a data bus 218 on which data may be sent to and from the input/output device 209.

The physical layer of the receiver 109 may comprise one or more decoding circuits 212 capable of performing FEC as described herein as well as one or more CRC circuits 215 capable of performing CRC in the physical layer of the receiver 109.

FEC is a technique used in communications to detect and correct errors in transmitted data. FEC works by adding, at the source 106, redundant information to the data being sent to the receiver 109. The redundant information may then be used at the receiver 109 to detect and correct errors that may occur during transmission as described in greater detail below. By using FEC, it is possible to detect errors in transmitted data and to either correct the errors without having to retransmit the entire data or request a retransmission of the data, leading to improved reliability and reduced transmission overhead. FEC as described herein may be used by the receiver 109 to check the data for errors in the physical layer using one or more decoding circuits 212.

CRC may be used to detect errors that may occur during transmission of data from the source 103 to the receiver 109. Using CRC, a CRC code, such as a fixed-length checksum, may be calculated from the data to be transmitted by the source 106 and this CRC code may be appended to the data by the source 106 prior to transmission.

At the receiver 109, the same or a similar calculation may be performed on the received data, and the result is compared to the received CRC code appended to the data. If the calculated CRC code matches the received CRC code, it may be assumed that the data has been transmitted or stored without errors. The FEC and CRC performed by physical layer of the receiver 109 is described in greater detail below.

In response to the error checking in the physical layer, the receiver 109 may send a retransmission request back to the source device 106 over the communication link 103 using the input/output device 209.

Using the systems and methods described herein, a receiver 109 such as a switch may be enabled to request retransmission of data as a result of an error check performed in the physical layer. If a received block of data fails the error check as described herein, it means that the data may have been corrupted during transmission and as a result the receiver 109 may request the source 106 retransmit the data.

As introduced above, a method involving error checking data in the physical layer of a receiver 109 may be performed by components of the receiver 109. An example of a method 400 that may be performed at the receiver 109 will now be described with reference to FIGS. 3 and 4. In the method 400 described herein, a retransmission decision can be based on one or both of results of a CRC calculator 327 and an RS decoder 309.

The systems and methods described herein provide a benefit as compared to conventional methods of requesting retransmissions. As described herein, a second rejection point, using CRC, is part of the physical layer instead of relying on the link layer. Typically, a CRC is part of the link layer. Performing CRC on the physical layer instead of the link layer reduces round trip time in the case of retransmission request. As a result, the systems and methods described herein can be used to reduce latency.

Data may be received by the receiver 109 in the form of electrical or optical signals and is converted into digital data blocks by the physical layer of the receiver. The error checking method may performed by analyzing these digital data blocks.

At 403, data may be received by the receiver 109. The data source 303 may be a stream of data received by an input/output device of the receiver 109 from a source 106 via a communication link 103 such as in the environment 100 illustrated in FIG. 1.

The data source 303 may correspond to the source 106 or may be a series of messages transmitted by a source 106. Each message may contain a payload containing the data to be communicated along with a code word. The code word included in each message may contain an RS code word and a CRC. For example, the source 106, when sending the message, may calculate an RS code word and a CRC for the specific message and send the CRC with the message. The receiver 109 may, as described below, decipher or recalculate the CRC and compare the received CRC with the recalculated CRC. Based on the comparison, as described below, a retransmission may be requested.

At 406, upon receiving the code word, an RS Syndrome 306 is generated. An RS syndrome 306 may be generated by the receiver 109 based on a codeword by evaluating a predefined polynomial at specific locations in the Galois Field. The polynomial is constructed such that its roots correspond to the error locations in the codeword. The values of the polynomial at these specific locations are called the syndromes.

To generate an RS syndrome, one or more decoding circuits 212 of the receiver 109 may first define the RS code by specifying the code parameters such as the number of data symbols, the number of redundant symbols, and/or the Galois Field used for the encoding and decoding process. Next, the decoding circuits 212 may construct an evaluation polynomial. The evaluation polynomial is a polynomial that represents the relationship between the error locations and the syndrome values. The decoding circuits 212 may next evaluate the polynomial at specific locations in the Galois Field to obtain the syndrome values. The locations in the Galois Field may be chosen such that the roots of the polynomial correspond to the error locations in the codeword. Finally, the decoding circuits 212 may in some embodiments store the syndrome values in memory for use in the RS error correction process.

An RS decoder 309 is a type of error correction decoder that is used to detect and correct errors in a codeword that was encoded using RS codes. The RS decoder 309 works by using mathematical algorithms to determine the location and value of errors in the codeword and then correcting those errors.

The RS decoder receives the codeword that was encoded using RS codes. Using the systems and methods described herein, the codeword may include a placeholder for the CRC generated by the source of the data. For example, if the RS codeword is X bits and the CRC is Y bits, the total codeword will be X+Y bits.

Figure 3:
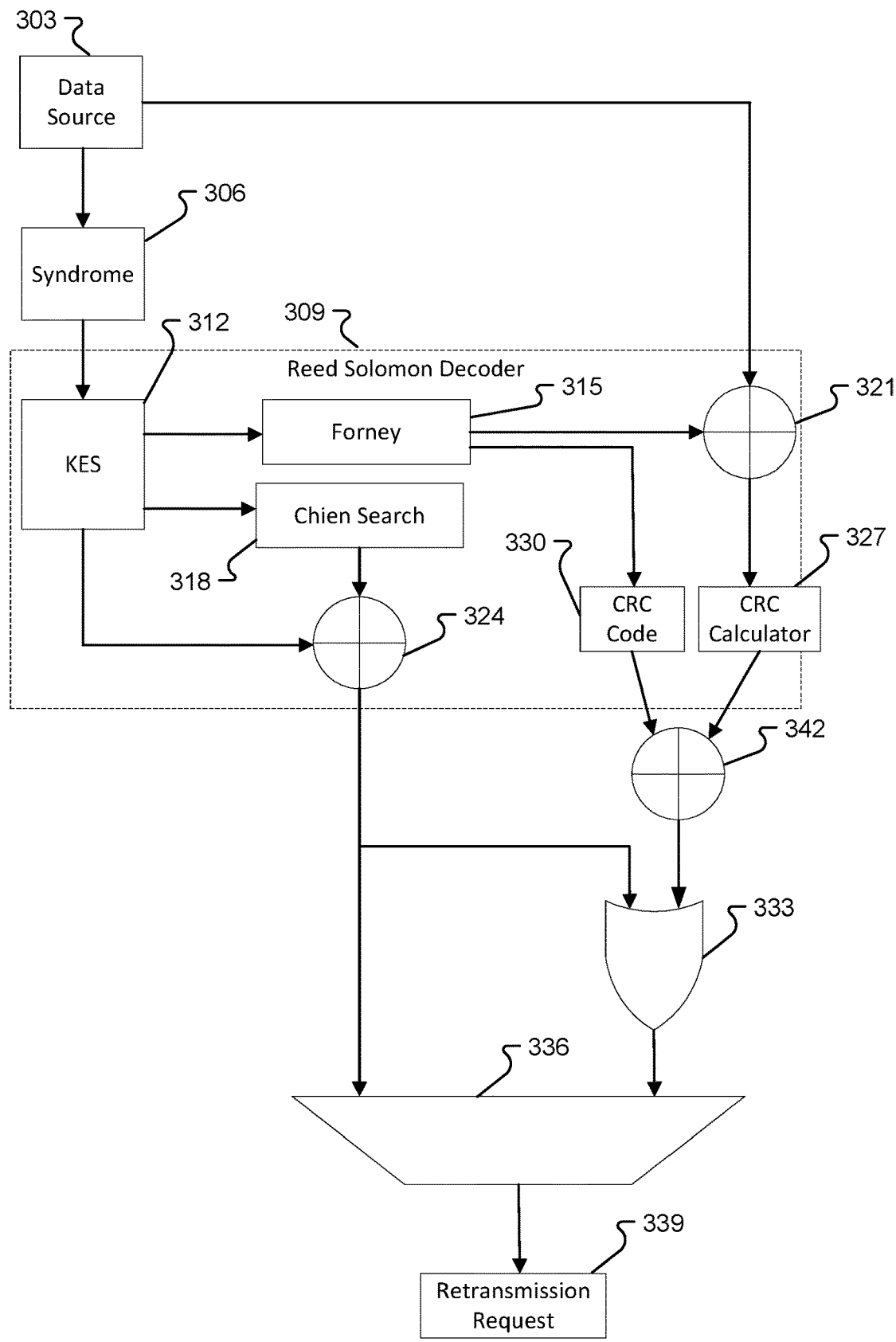
FIG. 3 is a block diagram of logic in accordance with one or more of the embodiments described herein.

At 409, and as illustrated in FIG. 3, a key equation solver (KES) 312 may be used to solve a polynomial equation that relates the syndrome 306 to error locations in the received codeword. The KES 312 uses the solution to the polynomial equation to determine the error locations in the received codeword. The KES 312 provides the information needed to correct errors in the received codeword. In particular, the KES 312 may be capable of determining a number of expected errors based on the solution to the polynomial equation.

In this process, the RS decoder 309 uses mathematical algorithms to detect and correct errors in the codeword. This helps to ensure the reliability and accuracy of the transmitted information and reduces the likelihood of errors in the network.

The specific algorithms and mathematical techniques used by an RS decoder can vary depending on the specific requirements of the network and the type of data being transmitted. However, the general process of using mathematical algorithms to detect and correct errors in the codeword remains the same.

Next, the RS decoder 309, implemented using the decoding circuits 212, performs a Chien search 318 at 412 and a Forney algorithm 315 at 415 based on the output of the KES 312.

The Chien search 318 performed at 412 is used in the decoding of RS codes. It is a key component of RS decoders and is used to determine the roots of a polynomial equation. A Chien search 318 as described herein is an efficient method for finding the roots of polynomial equations. In the context of determining if a retransmission of a message is necessary, the Chien search 318 is used to determine if errors have occurred in the transmission of the message.

The Chien search 318 takes as input a polynomial equation generated by the KES 312 from the syndromes 306 of the RS code contained in the message data source 303 and evaluates the equation at various points in a field. The Chien search 318 then identifies the roots of the polynomial by checking the values at which the equation evaluates to zero. The roots of the polynomial correspond to the error locations in the codeword, and these error locations may be used to correct errors in the received codeword.

If the Chien search 318 detects errors in the transmission of the message, it is an indication that the received codeword is corrupted and a retransmission of the message is necessary. This ensures that the received data is accurate and free of errors, and that the intended message is correctly received. In some implementations, retransmission may be determined to be necessary in the event that the number of expected errors based on the results of the KES 312 differs from the number of actual errors as determined using the Chien Search 318. In some implementations, the number of errors in the data may not prompt a retransmission unless the number of expected errors based on the results of the KES 312 differs from the number of actual errors as determined using the Chien Search 318 as it may be possible to repair identifiable errors.

The Chien search 318 is an algorithm for finding the roots of polynomial equations. Its simplicity and low computational complexity make it a valuable component of an RS decoder 309, particularly in high-speed networking systems where real-time error correction and/or detection is required.

The Chien search 318 may be configured to output the locations of the errors. The locations of the errors output by the Chien search 318 may be summed at 324 and compared with the expected number of errors created by the KES 312. IF there is a mismatch, the data block may be determined to be uncorrectable, and a retransmission request may be initiated at 339.

The first output of the decoding circuits is generated using a Forney algorithm 315 at 415. After using the KES 312 to find error values in the received codeword, a Forney algorithm 315 can be used to create a correction mask capable of being used to correct the received codeword. The Forney algorithm 315 is an error correction technique that can be used to correct a received codeword based on the error values found by the KES. The Forney algorithm 315 works by first calculating the error magnitudes and then using these magnitudes to generate a correction mask to be used to correct the received codeword.

At 321, the correction mask created using the Forney algorithm 315 may be used to correct the data as received from the data source 303. The corrected codeword may then be compared to the original message to determine if the decoder was successful in correcting the errors.

If the Forney algorithm 315 is unable to correct the received codeword, it indicates that the errors in the transmission are too severe, and a retransmission of the message is necessary. In this case, the decoder will request that the message be retransmitted to ensure that the received data is accurate and free of errors. The Chien search 318 and the Forney algorithm 315 may in some embodiments be performed in parallel.

At 418, one or more CRC circuits may be used to perform CRC based on the received data. CRC is a method for detecting errors in data transmission and determining whether retransmission of a message is necessary. CRC involves the use of a CRC code generated by the receiving device based on the contents of a received message and a CRC code received by the receiving device which was attached to the message before transmission. Upon receipt of the data from the data source 303, the receiver may calculate its own CRC code based on the data block corrected using the Forney algorithm 315 and compare the calculated CRC code with the CRC code attached to the received data. If the two CRC codes match, the data is considered to have been received correctly, and no retransmission is necessary. If the CRC codes do not match, the receiver can request retransmission of the data.

The data as corrected using the Forney algorithm 315 may be used as an input to a CRC calculator 327. A second input to the CRC calculator 327 may be either the data block as received from the data source 303 or a CRC code extracted from the data block as received from the data source 303 as corrected using the Forney algorithm 315. A corrected CRC code 330 may, at least in some implementations, be output by the Forney algorithm 315. The Forney algorithm 315 may be used to make corrections to the CRC as received from the data source 303 and to output the corrected CRC code 330. In this way, the CRC is FEC protected.

As illustrated in FIG. 3, the corrected CRC code 330 may be compared with an output of the CRC calculator 327 by a comparator 342.

The CRC circuits perform a comparison, in the physical layer, of a CRC code as received from the data source 303 in the received data block with a CRC code in the corrected data created using the Forney algorithm 315.

The CRC code in the received data block may be a checksum created by the data source 303. Comparing the CRC code as received from the data source 303 in the received data block with a corrected CRC code 330 in the corrected data created using the Forney algorithm 315 may in some embodiments comprise calculating a new checksum based on the corrected data created using the Forney algorithm 315.

In some embodiments, a checksum may be generated by the receiver 109 by performing a polynomial division based on the corrected data. The checksum may be a representation of the remainder of the division.

At 421, a determination may be made as to whether retransmission of the received data is necessary. The determination as to whether retransmission of the received data is necessary may be made based on either the Chien search 318 results alone, the comparison of the corrected CRC 330 and the output of the CRC calculator 327 alone, or a combination of the Chien search 318 and the comparison of the corrected CRC 330 and the output of the CRC calculator 327.

In some embodiments, a user may be enabled to select whether the retransmission decision is made based on either the Chien search 318 results alone, the comparison of the corrected CRC 330 and the output of the CRC calculator 327 alone, or a combination of the Chien search 318 and the comparison of the corrected CRC 330 and the output of the CRC calculator 327. For example, an OR gate 333 may be used to generate a retransmission request if either the comparison of the corrected CRC 330 and the output of the CRC 327 calculator or the Chien search 318 indicates retransmission is necessary.

A multiplexer 336 may be used to switch between using the Chien search 318 alone or between the results of the OR gate 333. The status of the multiplexer 336 may be set and/or adjusted using configuration settings stored in memory 206 of the receiver 109. If the Chien search 318 alone is used to determine whether the retransmission request should be generated, the CRC circuits may be disabled until needed.

At 424, if retransmission is not necessary, an acknowledgement (ACK) message may be transmitted to the source 103 and the received data may be transmitted up to the link layer of the receiver 109.

At 430, if retransmission is necessary based on one or more of a second output of the decoding circuits and an output of the CRC circuits, a retransmission request 339 of the data block is initiated and a negative acknowledgement (NACK) message may be transmitted to the source 103.

The ACK and/or NACK messages may be blocks of data transmitted directly from the physical layer of the receiver 109 to the source 103 in response to the received data. Using such a method, a retransmission request can be generated and transmitted before data reaches the link layer.

At 433, after transmitting the NACK message, the data received at 403 may be discarded, deleted, or otherwise not used by the receiver.

Figure 4:
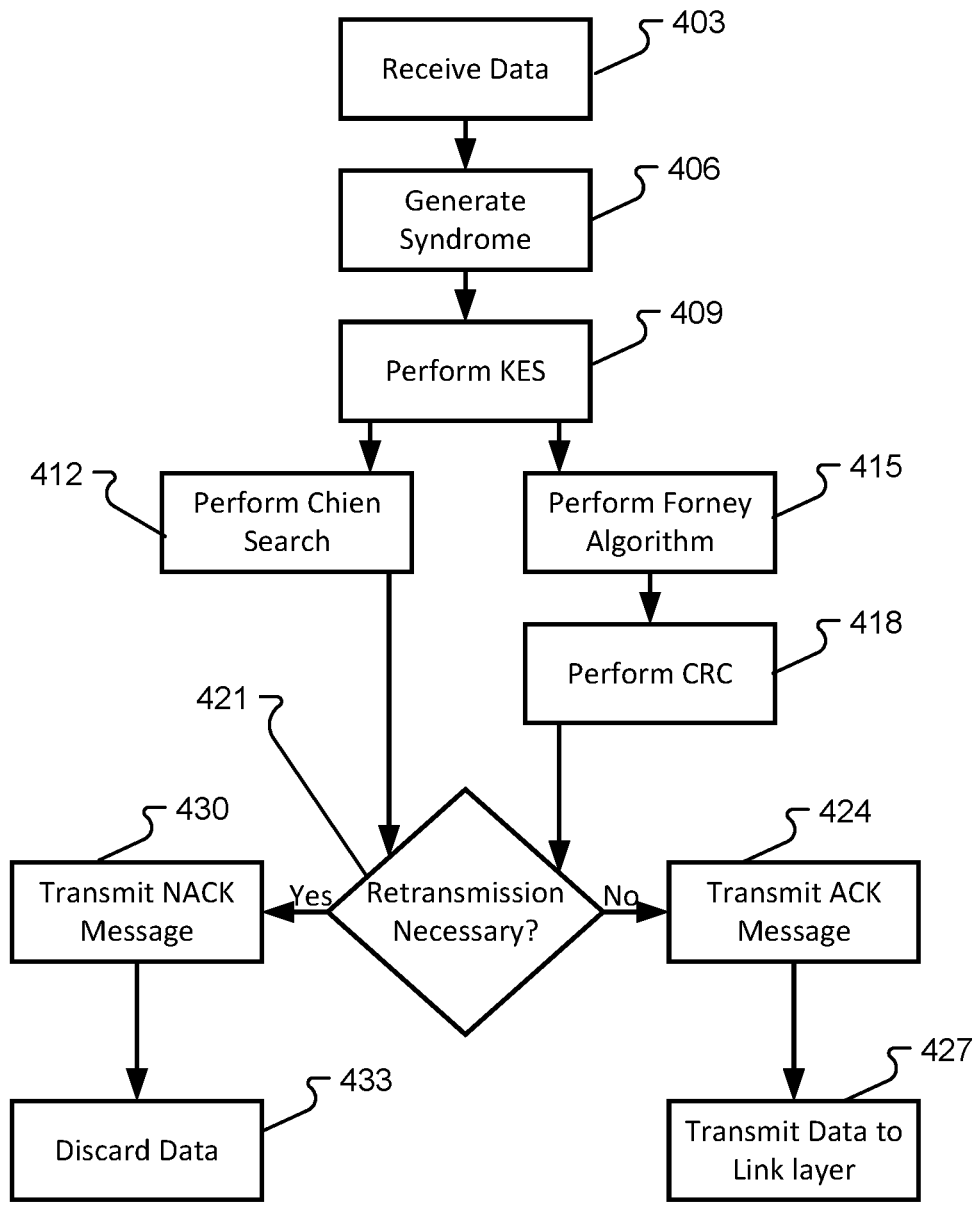
FIG. 4 is a flowchart of a method in accordance with one or more of the embodiments described herein.

The source 106, upon receiving the NACK, may retransmit the data to the receiver 109 and the method of FIG. 4 may restart with the newly received data. The receiver 109 receives the retransmitted data and performs a new check on the received data to verify its integrity. If the new data passes the check, the receiver 109 may accept the data and processes it as normal.

In this process, the receiver 109 uses the error checking system to detect errors in the received data and requests retransmission of the corrupted data to ensure the integrity of the transmitted information. This process helps to ensure that the data received by the switch is accurate and complete, reducing the likelihood of errors in the network.

The present disclosure encompasses embodiments of the method 400 that comprise more or fewer steps than those described above, and/or one or more steps that are different than the steps described above.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The present disclosure encompasses methods with fewer than all of the steps identified in FIG. 4 (and the corresponding description of the method), as well as methods that include additional steps beyond those identified in FIG. 4 (and the corresponding description of the method). The present disclosure also encompasses methods that comprise one or more steps from one method described herein, and one or more steps from another method described herein. Any correlation described herein may be or comprise a registration or any other correlation.

Embodiments of the present disclosure provide a communication system, comprising: one or more decoding circuits to perform FEC for a received data block in a physical layer; and one or more CRC circuits to perform a CRC based on a first output of the decoding circuits and a CRC code generated in the physical layer based on the received data block, wherein in response to one or more of a second output of the decoding circuits and an output of the CRC circuits, a retransmission request of the data block is initiated.

Aspects of the above communication system include wherein the decoding circuits perform an RS decoder.

Aspects of the above communication system include wherein the decoding circuits perform a Chien search.

Aspects of the above communication system include wherein the first output of the decoding circuits is generated using a Forney algorithm.

Aspects of the above communication system include wherein the Chien search and the Forney algorithm are performed in parallel.

Aspects of the above communication system include wherein the CRC circuits are enabled based on user settings.

Aspects of the above communication system include wherein the CRC circuits perform a comparison, in the physical layer, a CRC value in the received data block with a CRC value in the first output of the decoding circuits.

Aspects of the above communication system include wherein, after retransmitting the data block, a retransmitted data block proceeds from the physical layer to a data link layer of the communication system.

Aspects of the above communication system include wherein the physical layer is a physical coding sub layer (PCS).

Aspects of the above communication system include wherein initiating the retransmission request of the data block comprises transmitting the retransmission request.

Aspects of the above communication system include wherein retransmission of the data block is performed by a source of the received data block in response to the retransmission request.

Embodiments include an apparatus comprising: one or more decoding circuits to perform FEC for a received data block in a physical layer; and one or more CRC circuits to perform a CRC based on a first output of the decoding circuits and a CRC code generated in the physical layer based on the received data block, wherein in response to one or more of a second output of the decoding circuits and an output of the CRC circuits, a retransmission request of the data block is initiated.

Aspects of the above apparatus include wherein the decoding circuits perform an RS decoder.

Aspects of the above apparatus include wherein the decoding circuits perform a Chien search.

Aspects of the above apparatus include wherein the first output of the decoding circuits is generated using a Forney algorithm.

Aspects of the above apparatus include wherein the Chien search and the Forney algorithm are performed in parallel.

Aspects of the above apparatus include wherein the CRC circuits are enabled based on user settings.

Aspects of the above apparatus include wherein the CRC circuits perform a comparison, in the physical layer, a CRC value in the received data block with a CRC value in the first output of the decoding circuits.

Aspects of the above apparatus include wherein, after retransmitting the data block, a retransmitted data block proceeds from the physical layer to a data link layer of the communication system.

Aspects of the above apparatus include wherein the physical layer is a physical coding sub layer (PCS).

Aspects of the above apparatus include wherein initiating the retransmission request of the data block comprises transmitting the retransmission request.

Aspects of the above apparatus include wherein retransmission of the data block is performed by a source of the received data block in response to the retransmission request.

Embodiments include a method, comprising: performing, with one or more decoding circuits, FEC for a received data block in a physical layer; performing, with one or more CRC circuits, a CRC based on a first output of the decoding circuits and a CRC code generated in the physical layer based on the received data block; and in response to one or more of a second output of the decoding circuits and an output of the CRC circuits, initiating a retransmission request of the data block.

Aspects of the above method include wherein the decoding circuits perform an RS decoder.

Aspects of the above method include wherein the decoding circuits perform a Chien search.

Aspects of the above method include wherein the first output of the decoding circuits is generated using a Forney algorithm.

Aspects of the above method include wherein the Chien search and the Forney algorithm are performed in parallel.

Aspects of the above method include wherein the CRC circuits are enabled based on user settings.

Aspects of the above method include wherein the CRC circuits perform a comparison, in the physical layer, a CRC value in the received data block with a CRC value in the first output of the decoding circuits.

Aspects of the above method include wherein, after retransmitting the data block, a retransmitted data block proceeds from the physical layer to a data link layer of the communication system.

Aspects of the above method include wherein the physical layer is a physical coding sub layer (PCS).

Aspects of the above method include wherein initiating the retransmission request of the data block comprises transmitting the retransmission request.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

What is claimed is:

1. A communication system, comprising:
   one or more decoding circuits to perform:
      forward error correction for a data block to generate a first output; and
      determine one or more locations of one or more errors in the data block;
   a comparator circuit to compare a number of the one or more locations of the one or more errors in the data block with a number of expected errors in the data block and output a result as a second output;
   one or more cyclic redundancy check (CRC) circuits to perform a CRC based on the first output and a CRC code generated based on the data block to generate a third output; and
   a switching circuit to initiate a retransmission request for the data block based on at least the second output.

2. The communication system of claim 1, wherein the one or more decoding circuits perform a Reed-Solomon decoding.

3. The communication system of claim 1, wherein the one or more decoding circuits perform a Chien search.

4. The communication system of claim 3, wherein the first output is generated using a Forney algorithm.

5. The communication system of claim 4, wherein the Chien search and the Forney algorithm are performed in parallel.

6. The communication system of claim 1, wherein the one or more CRC circuits are enabled based on user settings.

7. The communication system of claim 1, wherein the one or more CRC circuits perform a comparison of a CRC value in the data block with a CRC value in the first output.

8. The communication system of claim 1, further comprising:
   a logic circuit to generate a fourth output based on the second output and the third output.

9. The communication system of claim 8, wherein the switching circuit initiates the retransmission request based on the fourth output.

10. The communication system of claim 1, wherein initiating the retransmission request of the data block comprises transmitting the retransmission request.

11. The communication system of claim 1, wherein retransmission of the data block is performed by a source of the data block in response to the retransmission request.

12. An apparatus comprising:
one or more decoding circuits to perform:
    forward error correction for a data block to generate a first output; and
    determine one or more locations of one or more errors in the data block;
a comparator circuit to compare a number of the one or more locations of the one or more errors in the data block with a number of expected errors in the data block to generate a second output;
one or more cyclic redundancy check (CRC) circuits to perform a CRC based on the first output and a CRC code generated based on the data block to generate a third output; and
a switching circuit to initiate a retransmission request for the data block based on at least the second output.

13. The apparatus of claim 12, wherein the one or more decoding circuits perform Reed-Solomon decoding.

14. The apparatus of claim 12, wherein the one or more decoding circuits perform a Chien search.

15. The apparatus of claim 14, wherein the first output is generated using a Forney algorithm.

16. The apparatus of claim 15, wherein the Chien search and the Forney algorithm are performed in parallel.

17. The apparatus of claim 12, wherein the one or more CRC circuits are enabled based on user settings.

18. The apparatus of claim 12, wherein the one or more CRC circuits perform a comparison of a CRC value in the data block with a CRC value in the first output.

19. The apparatus of claim 12, further comprising:
a logic circuit to generate a fourth output based on the second output and the third output, wherein the switching circuit initiates the retransmission request based on the fourth output.

20. A method, comprising:
with one or more decoding circuits:
    performing forward error correction for a data block to generate a first output; and
    determining one or more locations of one or more errors in the data block;
comparing a number of the one or more locations of the one or more errors in the data block with a number of expected errors in the data block to generate a second output;
performing, with one or more cyclic redundancy check (CRC) circuits, a CRC based on the first output and a CRC code generated based on the data block to generate a third output; and
initiating a retransmission request for the data block based on at least the second output.

* * * * *